United States Patent [19]

Leichle

[11] 4,139,809
[45] Feb. 13, 1979

[54] D.C. CHOPPER CONTROL DEVICE FOR ELECTRIC MOTORS

[75] Inventor: Claude Leichle, Boulogne-Billancourt, France

[73] Assignees: Regie Nationale des Usines Renault, Boulogne-Billancourt; Automobiles Peugeot, Paris, both of France

[21] Appl. No.: 650,245

[22] Filed: Jan. 19, 1976

[30] Foreign Application Priority Data

Jan. 20, 1975 [FR] France .................. 75 01588

[51] Int. Cl.² .......................... H02P 5/06; H02P 5/34; H02P 7/06
[52] U.S. Cl. ................... 318/341; 318/318; 318/599; 318/139; 318/332
[58] Field of Search ............... 318/341, 318, 599, 139, 318/332, 432, 434

[56] References Cited

U.S. PATENT DOCUMENTS

| 3,096,483 | 7/1963 | Ransom | 318/318 |
| 3,243,681 | 3/1966 | Dannetell | 318/332 |
| 3,378,746 | 4/1968 | Weiser | 318/332 |
| 3,393,366 | 7/1968 | Shoop | 318/341 |
| 3,609,488 | 9/1971 | Sampson et al. | 318/318 |
| 3,843,914 | 10/1974 | Carlson et al. | 318/341 |
| 3,958,182 | 5/1976 | Sauthier | 318/341 |

FOREIGN PATENT DOCUMENTS 1538372 4/1969 Fed. Rep. of Germany ........... 318/341

Primary Examiner—Robert K. Schaefer
Assistant Examiner—Eugene S. Indyk
Attorney, Agent, or Firm—Fleit & Jacobson

[57] ABSTRACT

The invention relates to a control device for D.C. motors operating by chopping the supply current. Said device comprises a voltage-frequency converter, a frequency divider, a monostable multivibrator, an analog-digital converter, a pulse down-counter and a bistable flip-flop, arranged to chop the direct current supply by means of a hit or miss control signal of which the cyclic ratio is a linear function of a control voltage U.

5 Claims, 6 Drawing Figures

Fig: 3

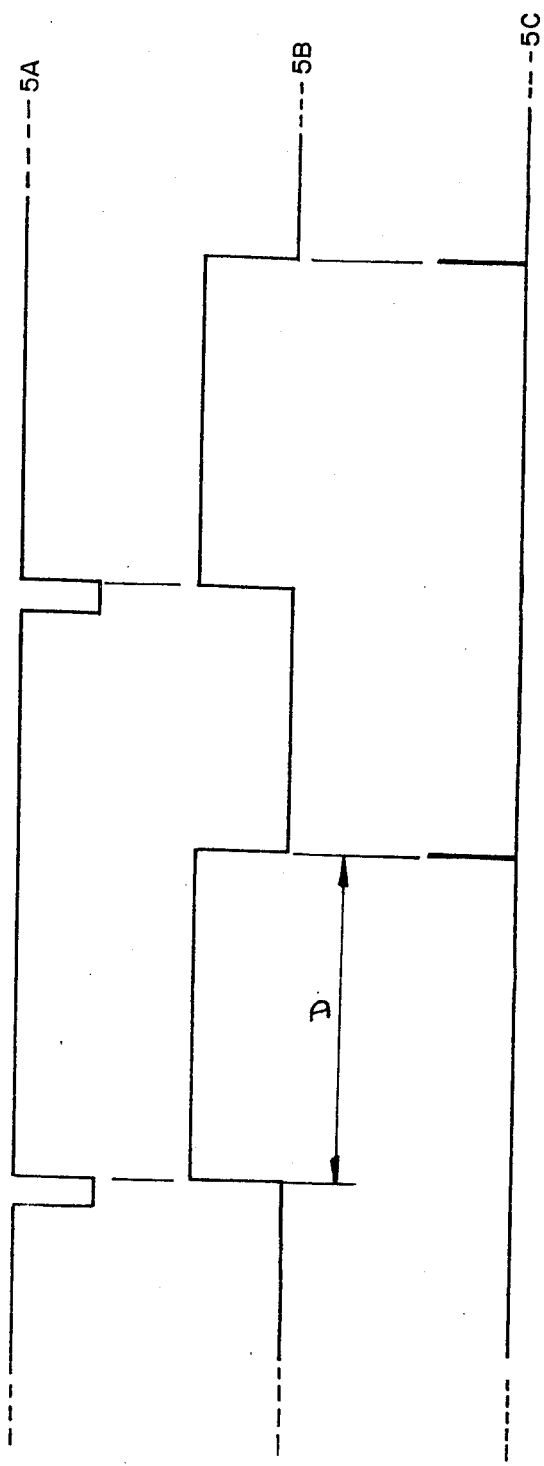

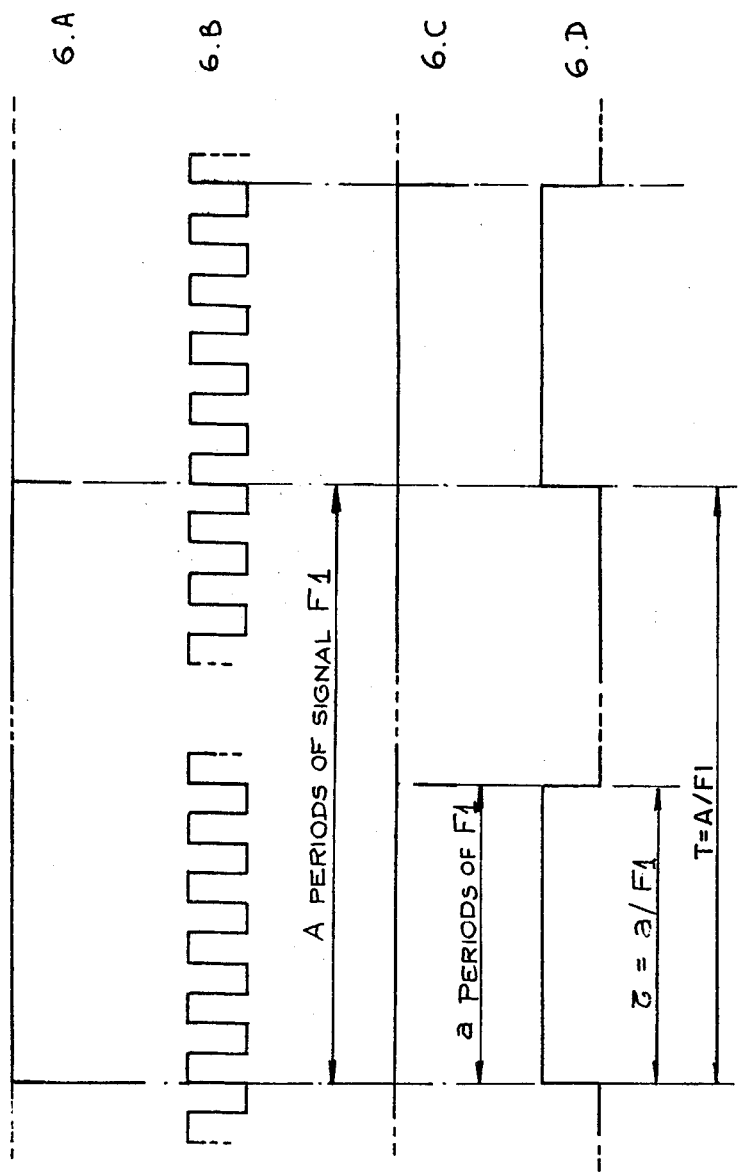

D.C. CHOPPER CONTROL DEVICE FOR ELECTRIC MOTORS

The present invention relates to the supply of D.C. to electric motors and has specific reference to a device for controlling a D.C. motor by chopping its energizing direct-current, with concomitant variation of the chopping frequency and conduction time.

One of the known methods of controlling a D.C. motor consists in controlling the current flowing through this motor. In these methods, it is customary to use means for chopping the voltage across the motor terminals in order to produce a chopped or hatched current of which the chopping period denoted T comprises two phases, i.e. a phase having a time $\tau$ during which the voltage fed to the motor is equal to the maximum voltage available, therefore, a phase during which the current has also its maximum value $I_M$, and another phase having a time $T - \tau$ during which the voltage across the motor terminals is zero, the current also having zero value. The average current value I during one period is thus $I = I_M \times (\tau/t)$, and the controlling of this average current consists simply in controlling the ratio $\tau/T$, also referred to as the cyclic ratio of the voltage controlling the chopping members. Therefore, a motor control device is obtained by generating a power element control signal of the "hit or miss" (or "on - off") type of which the cyclic ratio is a linear function of a reference magnitude, generally a control voltage U.

To obtain this function two types of solutions are utilized in existing devices. A first method of controlling the cyclic ratio of a "on - off" control signal consists in generating such signal of fixed frequency F, of which the conduction time $\tau$ varies in proportion to the control voltage U. Thus, the motor is fed with a pseudo alternating current of frequency F and, to ensure a proper operation irrespective of the motor velocity, this value F must be relatively high. As a result, considerable losses are experienced, since each switching of the power means is a cause of energy dissipation. Another known method of controlling the cyclic ratio consists in generating a signal of fixed conduction time and having a frequency F proportional to the control magnitude U. In this case, since the current is expected to vary between a maximum value and the zero value, the frequency must also be close to zero, which causes a noisy operation of the motor attended by an insufficient progressiveness of the control device at low current values.

Now, it is the essential object of this invention to provide a third type of device for controlling a D.C. motor by the simultaneous variation of frequency and conduction time, both variations being so related to each other that the linearity between the control voltage U and the cyclic ratio of the current, and therefore its average value, are preserved. Due to the possibility thus afforded of varying the current frequency through a limited range, it is possible with this device to improve the motor efficiency at low current values while preserving a frequency value sufficient for improving the flexibility of operation of the controlled motor. The principle on which the device according to this invention is based may be summarized as follows:

The value F of the chopping current is set by means of a device responsive to the control voltage, the response of this device being in turn of any desired character. The time corresponding to the period of this current is divided into N equal portions. An analog-digital converter generates from the control voltage U a number n proportional thereto, the total variation of this number n being spread over the range 0 to N. A device makes the power members conductive during n among the N portions of the control signal period. As a result, the current frequency assume the value F (which frequency may vary in any desired manner as a function of U) with a cyclic ratio n/N, i.e. proportional to U since N is a constant.

The advantages resulting from the device of this invention pertain to several types:

the frequency variations may be determined independently of the actual variations of the current proper, thus affording a lower dynamics of the frequency variations than that of current variations. Under these conditions, the efficiency is improved since with a low current the frequency is reduced and the problems arising in case of abnormally low current are safely eliminated for frequency decreases at a slower rate than current while preserving a finite value with a zero current value;

from a similar point of view, one may contemplate a frequency value controlled as a function of the real motor velocity, instead of as a function of the reference value of the current, thus affording an all-round high-efficiency motor operation;

in the device of this invention the variation of the current cyclic ratio as a function of the control voltage U is linear, thus permitting of inserting the device in a closed loop (with real current measurement and feedback), without any apprehension for instabilities possibly caused by non-linear devices;

the discontinuous character of the device, as a consequence of the digital treatment of date, permits of adapting the adjustment precision to the desired degree of accuracy for the system incorporating the controlled motor.

In fact, the higher the number N, the lower the variation increment in the cyclic ratio and therefore the greater the adjustment fineness. Now the complexity and therefore the cost of the system are closely related to the magnitude of said number N. Thus, the best possible cost to performances ratio can be achieved.

Finally, due to this same digital treatment it is possible to contemplate a integrated-mass form of embodiment for increasing reliability and reduce costs.

The applications of this device are those requiring the adjustment of the point of operation of an electric motor fed from a source of direct current. Thus, more particularly, any devices for controlling the motors of electric vehicles may be equipped with the system of this invention.

Other features and advantages of this invention will appear as the following description proceeds with reference to the accompanying drawings, in which:

FIG. 5 illustrates the diagram of the signals produced by the device of FIG. 4; and FIG. 6 is a similar diagram of the signals produced by the device of this invention.

Figure 1:
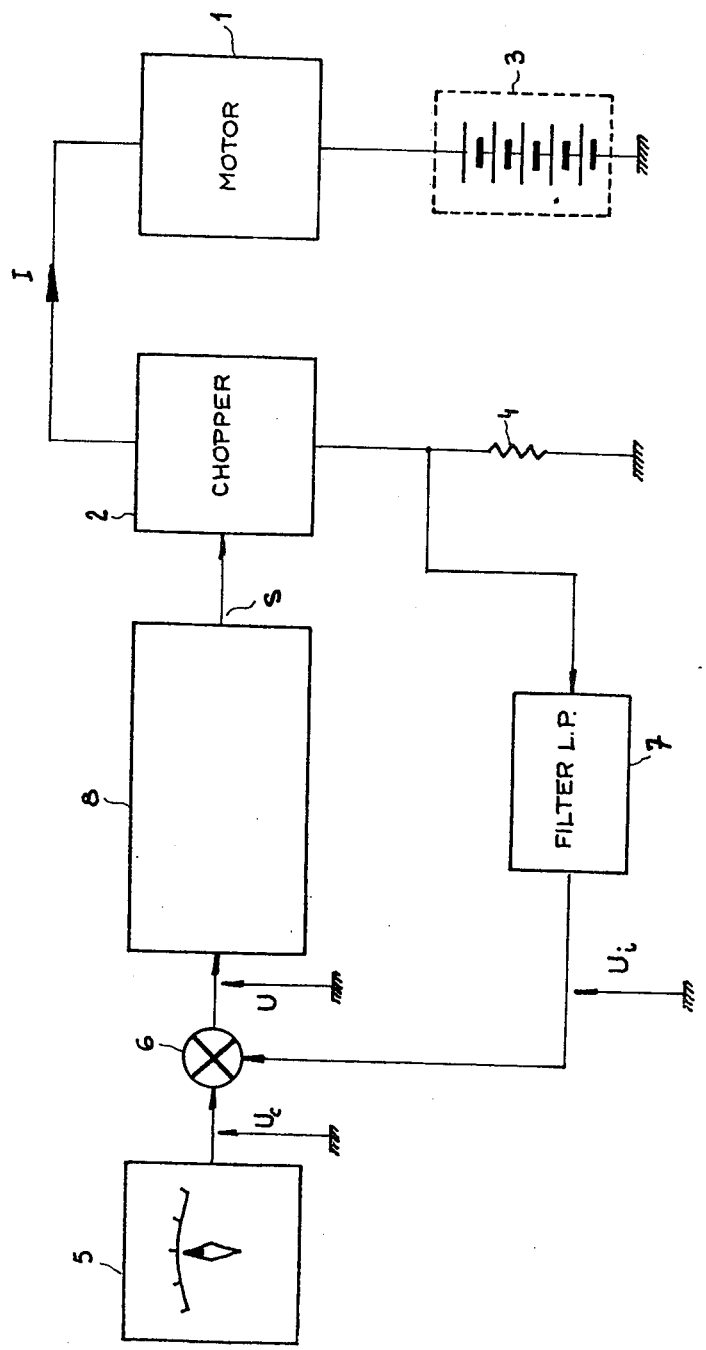
FIG. 1 illustrates in block diagram the arrangement for controlling a D.C. motor and incorporating the device of this invention.

Referring first to FIG. 1, the motor 1 is fed through the medium of a chopper 2 from a storage battery 3. Inserted in the power circuit is a shunt 4 for measuring the current I flowing through the motor 1. A control member 5 is provided for displaying a reference value of said current I and generating a voltage Uc proportional thereto. This voltage Uc as well as a voltage Ui are fed to a comparator 6. The voltage Ui is taken from the output of a low-pass filter 7 supplied likewise through the shunt 4. Therefore, this voltage Ui is the display of the real current I. From the output of said comparator 6 the voltage U is directed through a device 8 constituting the subject-matter of this invention. This device 8 is adapted to generate a signal S for controlling the chopper 2, i.e. a "hit or miss" control signal having predetermined frequency and cyclic ratio.

Figure 2:
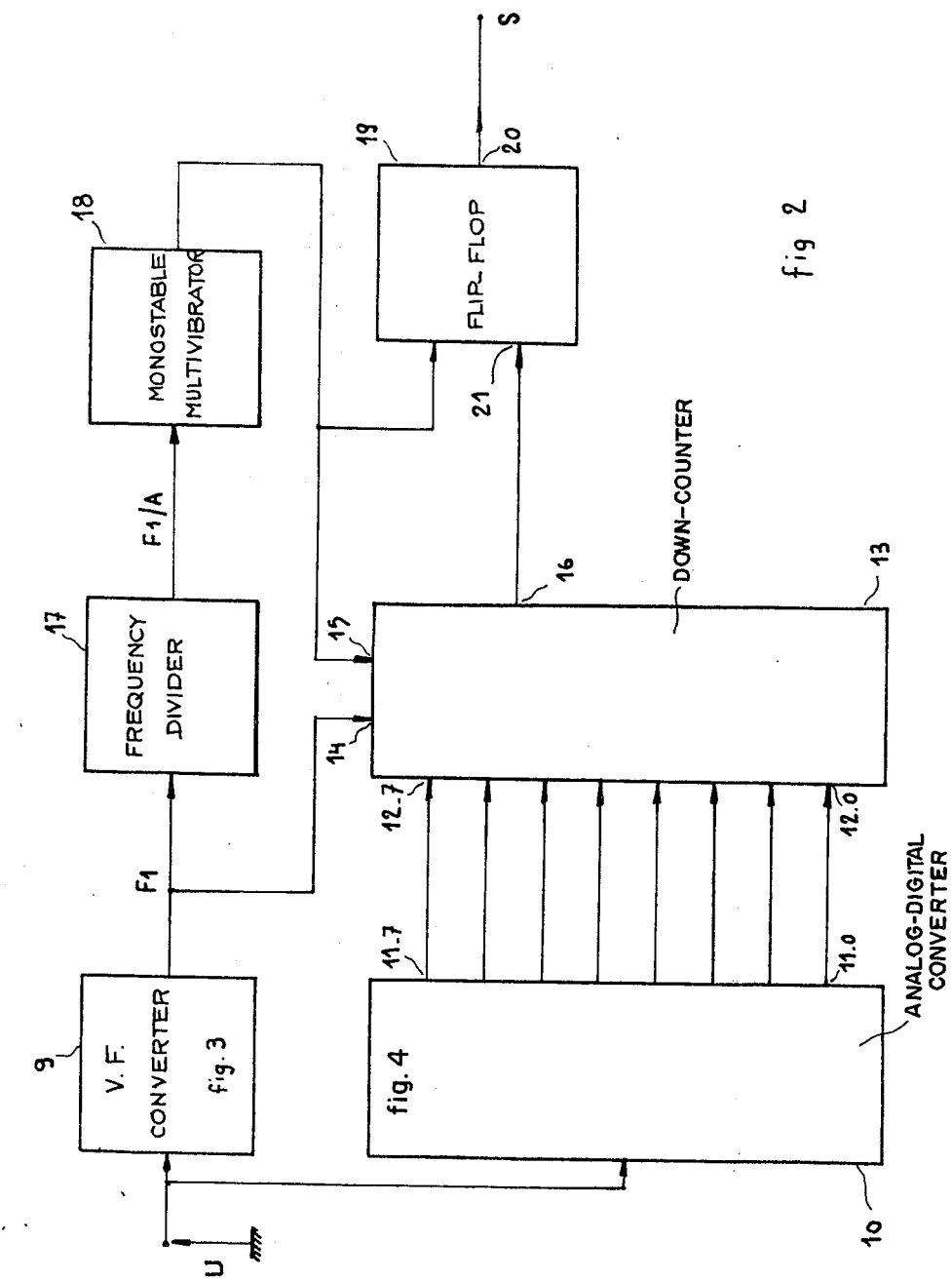
FIG. 2 is another block diagram showing more particularly the device of this invention.

As shown in FIG. 2 illustrating diagrammatically by way of example the device 8 of this invention the control voltage U is fed to a voltage-frequency converter 9 delivering a signal of frequency $F_1$. This same voltage U is also fed to an analog-digital converter 10 delivering a binary number "a" proportional to U in a parallel form, via its output bits. In the form of embodiment illustrated and described herein the number "a" comprises eight bits, this accounting for the fact that the converter has eight outputs designated by the reference symbols 11-0 to 11-7. This number "a" is also applied to the predetermining inputs 12-0 to 12-7 of a down-counter 13. This down-counter 13 may advantageously be constructed by using commercially available integrated elements, such as the SN 74 193 circuits manufactured by Texas Instruments. In the form of embodiment described herein, two counters of this type are used, and reference may be made to the manufacturer's instruction booklets for connecting them in actual practice.

The down-counter 13 to which said number "a" is fed comprises a clock input 14 to which the signal of frequency $F_1$ delivered by converter 9 is fed, another loading input 15 and a so-called retaining input 16. When a pulse is fed to input 15 the number "a" is recorded in the flip-flops of the down-counter. When from that time "a" pulses of the signal fed to 14 have been actually down-counted, a pulse is displayed at the retaining output 16.

The signal $F_1$ from converter 9 is fed to a frequency divider 17 delivering at its output a signal having a frequency $F_1/A$, in which A is the maximum value assumed by "a" when U varies. This signal is fed to the loading input 15 of down-counter 13 via a monostable multivibrator 18. This signal available at the output of said monostable multivibrator is also fed to the input of a bistable flip-flop 19 of which the output 20 will thus become operative. The same flip-flop has a resetting input 21 to which the signal from down-counter 13 is fed.

Figure 3:
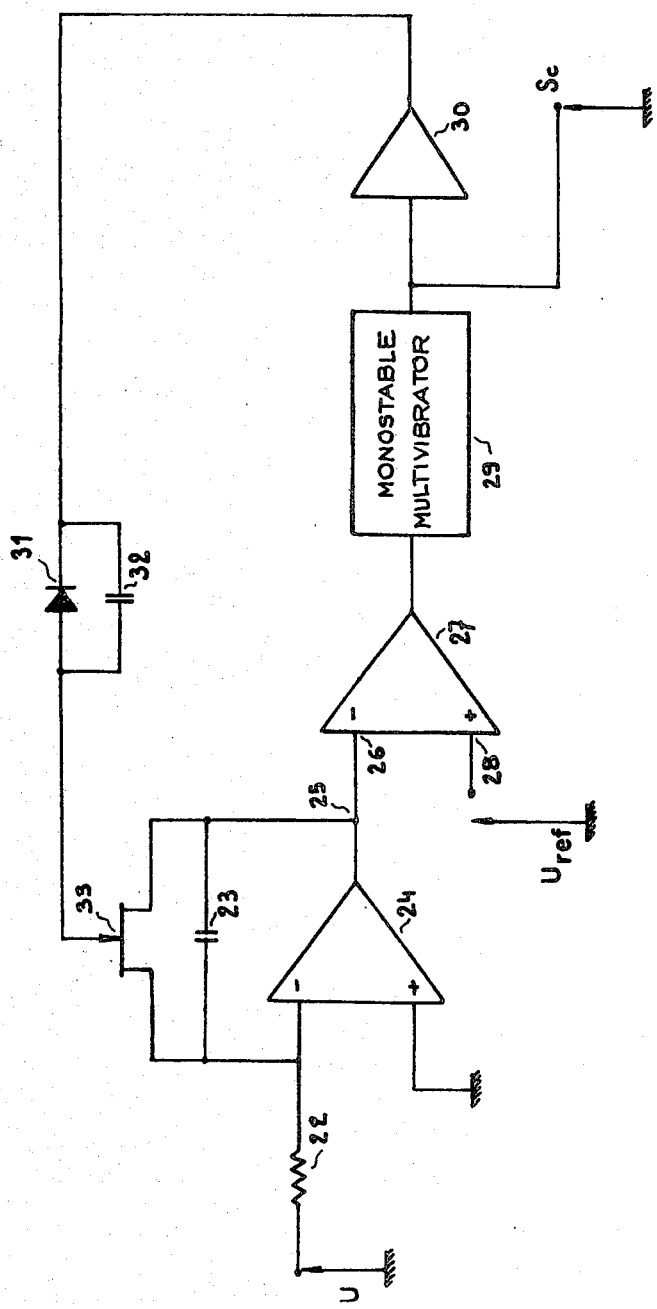
FIG. 3 illustrates a typical form of embodiment of the voltage-frequency converter of FIG. 2.

In the form of embodiment illustrated in FIG. 3, the voltage U is fed to the input of an integrator comprising a resistor 22, a capacitor 23 and an operational amplifier 24. The voltage from the output 25 of this amplifier is therefore a slope as a function of the slope time which is proportional to U. This voltage is fed to the reversing input 26 of a comparator 27 adapted to be tipped when this voltage rises to a potential at least equal to the reference voltage $U_{ref}$ fed to its non-reversing input 28. The tipping of comparator 27 causes a pulse to be generated at the output of a monostable multivibrator 29 to which it is connected. This pulse, amplified by an amplifier 30, is fed via a diode 31 and a capacitor 32 connected in parallel to the diode to a field effect transistor 33 which short-circuits the capacitor 23 to permit the resumption of the cycle. The frequency F of the pulses at the output Sc of monostable multivibrator 29 is the reverse of the charging time of capacitor 23, i.e.:

$$F = U \times \frac{1}{U_{ref} CR}.$$

In this relationship, U is the value of the input voltage, $U_{ref}$ the value of the voltage fed to the input 28 of comparator 27, C the value of capacitor 23, and R the value of resistor 22. Therefore, the frequency of the output signal Sc from the output of monostable multivibrator 29 is proportional to the input voltage.

Figure 4:
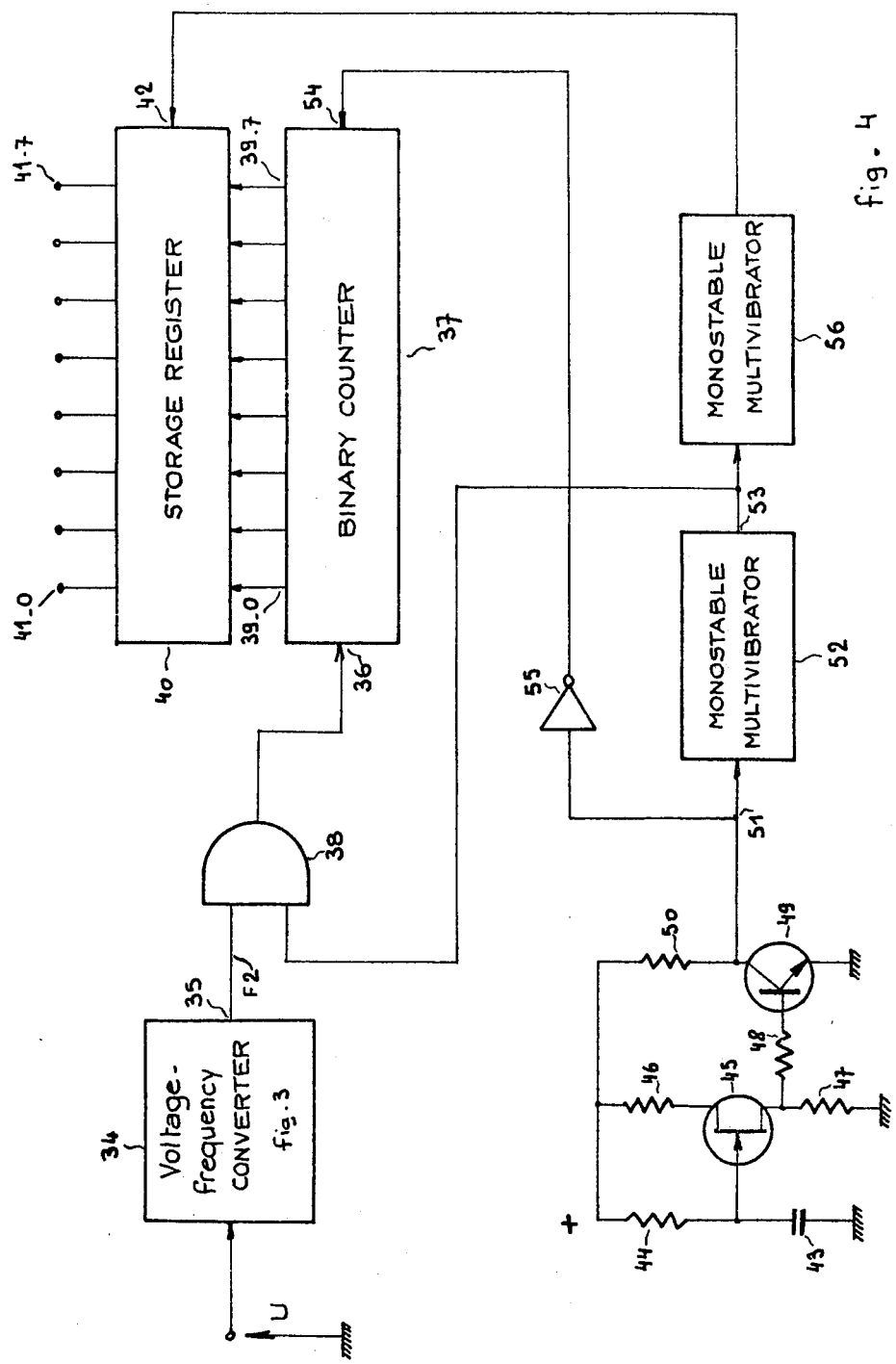
FIG. 4 is a diagram illustrating a typical form of embodiment of the analog-digital converter of FIG. 2.

As shown in FIG. 4, the voltage U of which the value is to be converted into a binary number is fed to the input of a voltage-frequency converter 34 similar to the one illustrated in FIG. 3. This converter generates at its output 35 a signal having a frequency $F_2$ such that $F_2 = kU$, wherein k is a constant coefficient. This signal is fed via an AND gate 38 to the counting input 36 of a binary counter 37 consisting of a bistable flip-flop or, still better, of integrated elements of the SN 7493 type manufactured by Texas Instruments. Similar circuits are available from many other manufacturers. The instruction booklets issued by these manufacturers permit of assembling these elements in series in order to obtain a counter having 256 positions (i.e. eight binary outputs designated by the reference numerals 39-0 to 39-7) as required for the purposes of this invention. These eight outputs are each connected to the input of a storage bistable flip-flop 40. Also available commercially are such bistable flip-flops mounted in the register form comprising several bistable flip-flops. Thus, for instance, the circuit SN 74 100 manufactured by Texas Instruments provides eight bistable flip-flops in a common case. Similar elements may also be obtained from other manufacturers. The register 40 utilized in the form of embodiment described herein will thus comprise eight data inputs and with the eight outputs 41-0 to 41-7 the binary number fed to the inputs are permanently available when a pulse is fed to the register input 42. A timer is obtained as follows: a capacitor 43 and a resistor 44 are connected in series between the ground and the positive terminal of a supply source. The point common to said resistor 44 and capacitor 43 is connected to the emitter of a unijunction transistor 45 having one base connected to the positive terminal of the source of current via a resistor 46, the second base of said transistor being grounded via another resistor 47. The voltage is taken from one terminal of resistor 47 and fed via another resistor 48 to the base of a transistor 49 having its emitter grounded and its collector connected to the positive supply terminal via a further resistor 50. Thus, a pulse generator is obtained of which the recurrent frequency is bounded to the values of capacitor 43 and resistor 44. These pulses available at a point 51 common to resistor 50 and transistor 49 are applied on the one hand to a monostable multivibrator 52 delivering at 53 a pulse of duration D from the leading edge of the control pulse and on the other hand to the resetting input 54 of binary counter 57 via a reversing switch 55. The pulse available at the output 53 of monostable multivibrator 52 is coupled to the second input of said AND gate 38 and also to a second monostable multivibrator 56 which, at the trailing edge of the control pulse, delivers a brief pulse transmitted to the write-in or recording input 42 of storage register 40.

The mode of operation of the analog-to-digital converter of FIG. 4 will now be explained with reference to the signal diagram of FIG. 5.

Upon each pulse generated at 51 (FIG. 5, line 5A) the binary counter 37 is reset. The output pulse of monostable multivibrator 52 starts at the leading edge of the pulse at 51 and has a duration D (FIG. 5, line 5B). During this time period, the AND gate 48 permits the passage of the signal $F_2$ emitted by the converter 34, and the counter 37 begins to count. At the end of this counting phase, i.e. at the trailing edge of said pulse appearing at the output of said multivibrator 53, the monostable multivibrator 56 generates a pulse illustrated in FIG. 5, line 5C, causing the result of this counting step to be written-in in register 40 and to become available at outputs 41-0 to 41-7. The value of this number is the product of the frequency by the counting time, i.e. in the present instance: $F_2 \times D$ still equal to $k \times U \times D$. Since k and D are constants, the number is in fact proportional to U. It is constantly available as an output, except during the short write-in pulse time in register 40.

Now, the actual mode of operation of the control device according to the present invention as illustrated in FIG. 2 can be explained with reference to the diagrams of FIG. 6 showing the signals available at the principle points of the device. The voltage U produces in fact two magnitudes: on the one hand a signal $F_1$ through converter 9 which in the specific case of the above-described application undergoes a linear variation as a function of U but can also vary in other fashion without impairing the character of the device, and on the other hand a binary number a through the medium of converter 10. This number varies from zero (when U has its minimum value) to A (when U has its maximum value).

In the form of embodiment illustrated A = 100 but its value may in fact differ from this figure. This signal having a frequency $F_1$ delivers via frequency divider 17 and monostable multivibrator 18 a pulse each time A-pulses having said frequency $F_1$ have been generated. This signal is illustrated in FIG. 6-A as registering with the signal $F_1$ of line 6-B. Each pulse of signal $F_1/A$ received from the monostable multivibrator 18 energizes the bistable flip-flop 19 and causes the number a from converter 10 to be written in into the down counter 13. The latter will thus down-count a pulses of signal $F_1$ received at 14 to generate at the end of the counting period a pulse at its retaining output 16. This pulse shown in FIG. 6-D is used for resetting the flip-flop 19 of which the output signal may be shown at 6-D. The same signal is used for controlling the power circuit 2 controlling in turn the energization of motor 1 of FIG. 1.

Proof must be given that the cycle ratio of this signal is definitely proportional to U whatever the value of $F_1$ may be. In fact, the frequency of the output signal is given by the activation signal of flip-flop 19. It is therefore equal to $F_1/A$. Its period is thus $T = A/F_1$. The energization time of the flip-flop is linked to the time required for the counter 13 to down-count a/a pulses having a frequency $F_1$. This time period is $\tau = a/F_1$.

The cyclic ratio R of the output signal is expressed as the ratio of its duration to its period, i.e.:

$$R = \frac{\tau}{T} = \frac{a}{F_1} \times \frac{F_1}{A} = \frac{a}{A}.$$

The value of $F_1$ is not a determining one in the expression of this ratio. Since a is proportional to the incoming voltage U, and A is constant, the ratio R depends only on U, which is the intended purpose.

Of course, the form of embodiment described hereinabove with reference to the accompanying drawings should not be construed as limiting the present invention, since, inter alia, for this specific form of embodiment it is possible to use commercially available complex integrated circuits affording both an easy construction and a high degree of reliability.

What is claimed as new is:

1. A device for controlling the supply of current to a direct-current motor by chopping said direct current by means of a control signal of the "hit or miss" type, wherein the cyclic ratio of said control signal is a linear function of a reference magnitude consisting of a control voltage U, comprising means for providing a reference magnitude comprising a control voltage U, means for generating the frequency of the hit or miss control signal, means for determining the conduction time of said signal, and coupling means for coupling said means for generating the frequency of the hit or miss control signal to the means for determining the conduction time of said signal in such a manner that the cyclic ratio of said signal is a linear function of said reference magnitude, said means for generating the frequency of the hit or miss control signal comprises a voltage-frequency converter receiving said control voltage U at its input, and said means for determining the conduction time of said signal comprising an analog-digital converter receiving said control voltage U at its input and generating a binary number at its outputs.

2. A control device according to claim 1, wherein said voltage-frequency converter generates a frequency, said means for generating a frequency further comprises a frequency divider, means for connecting the output of said voltage-frequency converter to said frequency divider, a monostable multivibrator, and means for connecting the output of said frequency divider to said monostable multivibrator.

3. A control device according to claim 2, wherein said means for determining the conduction time of said signal further comprises a pulse down-counter having its inputs connected to the corresponding outputs of said analog-digital converter, a clock input connected to the output of said voltage-frequency converter and a loading input connected to the output of said monostable multivibrator, said coupling means comprises a bistable flip-flop having one input connected to the output of said monostable multivibrator, the output signal of said bistable flip-flop constituting the hit or miss control signal to be fed to said direct-current chopper.

4. A control device as claimed in claim 3 wherein said bistable flip-flop further comprises a second input connected to the output of said pulse down counter.

5. A control device as claimed in claim 4 wherein said means for providing a reference magnitude comprises means for providing a control voltage U proportional to the supply of current in a D.C. motor.

* * * * *